United States Patent [19]

Freeman

[11] 4,169,178

[45] Sep. 25, 1979

[54] PRODUCTION OF AROMATIC POLYETHERS

[75] Inventor: John L. Freeman, St. Neots, England

[73] Assignee: Imperial Chemical Industries Limited, London, England

[21] Appl. No.: 883,312

[22] Filed: Mar. 3, 1978

Related U.S. Application Data

[63] Continuation-in-part of Ser. No. 798,885, May 20, 1977, abandoned.

[30] Foreign Application Priority Data

Mar. 14, 1977 [GB] United Kingdom ............... 10623/77

[51] Int. Cl.² ............................................. C08G 65/40
[52] U.S. Cl. .................................. 528/126; 528/125; 528/128; 528/174; 528/219
[58] Field of Search ................... 260/47 R, 49, 50, 61; 528/125, 126, 128, 174, 219

[56] References Cited

U.S. PATENT DOCUMENTS

| | | | |
|---|---|---|---|
| 3,332,909 | 7/1967 | Farnham et al. ....................... | 260/47 |
| 3,941,748 | 3/1976 | King ..................................... | 260/47 R |
| 4,009,149 | 2/1977 | King et al. ............................. | 260/49 |
| 4,010,147 | 3/1977 | Rose .................................. | 260/79.3 M |
| 4,036,815 | 7/1977 | Feasey et al. .......................... | 260/49 |

*Primary Examiner*—Lester L. Lee
*Attorney, Agent, or Firm*—Cushman, Darby & Cushman

[57] ABSTRACT

Aromatic polyethers are made by reacting i) an equimolar mixture of a bisphenol of formula

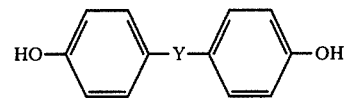

in which Y is a direct link, —O—, —S—, —SO₂—, —CO— or a divalent hydrocarbon radical, and an aromatic dihalo compound or ii) a halophenol, in which dihalo compound or halophenol the halogen atoms are activated by ortho or para —SO₂— or —CO— groups, with an alkali metal carbonate or bicarbonate. At least some of the halophenol and/or dihalo compound is fluorine containing. The amount of carbonate or bicarbonate is such that there is between 1 and 1−x/2 atoms of alkali metal per phenol group, where x is the fraction of activated halogen atoms that are fluorine.

9 Claims, No Drawings

PRODUCTION OF AROMATIC POLYETHERS

This application is a continuation-in-part application of my U.S. application Ser. No. 798,885 filed May 20, 1977 and now abandoned.

This invention relates to the production of aromatic polyethers and in particular to the production of certain aromatic polyethers containing sulphone or ketone linkages.

It has been proposed in Canadian Pat. No. 847 963 to make polyethers containing sulphone or ketone linkages by reacting a bisphenol and a dihalobenzenoid compound, or a halophenol, in which dihalobenzenoid compound or halophenol the halogen atoms are activated by $-SO_2-$ or $-CO-$ groups ortho or para thereto, with an alkali metal carbonate.

In that process the amount of alkali metal carbonate to be used is such that there are at least two atoms of the alkali metal per phenol group, or, if the reaction conditions e.g. temperature are such that the alkali metal bicarbonate formed by the reaction of the alkali metal carbonate with the phenol group decomposes, the amount of alkali metal carbonate to be used is such that there is at least one atom of alkali metal per phenol group. In general however a slight excess (up to 20 mole %) of alkali metal carbonate is employed.

I have now found that in certain cases the amount of alkali metal carbonate required may be reduced by employing fluorophenols or difluorobenzenoid compounds as part or all of the halogen containing reactants.

In British Pat. No. 1 348 630 there is described the production of aromatic polyethers by the reaction of a halophenol, or a mixture of a dihalobenzenoid compound with a phenol, with an alkali metal fluoride, and indicate that the alkali metal fluoride may be made in situ by self condensation of an alkali metal salt of a fluorophenol or by the condensation of an alkali metal salt of a bisphenol with a substantially equimolar amount of a difluorobenzenoid compound.

Although I do not wish to be bound by the theory I believe the process of the present invention proceeds via a similar reaction sequence which can be depicted as follows, taking the polymerisation of 4-fluoro-4'-hydroxybenzophenone with potassium carbonate as an example:

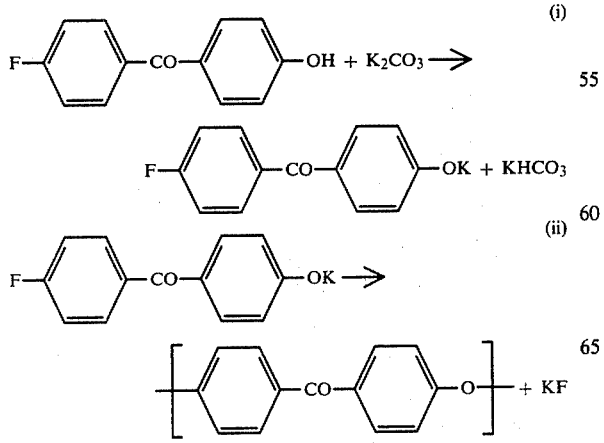

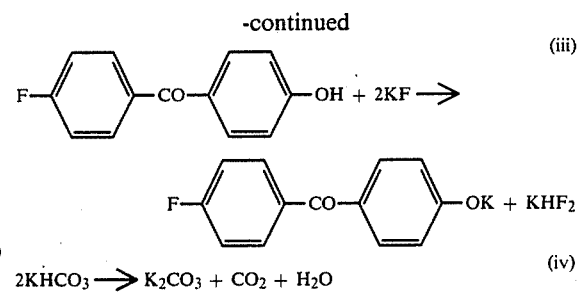

$2KHCO_3 \rightarrow K_2CO_3 + CO_2 + H_2O$    (iv)

Thus giving overall:

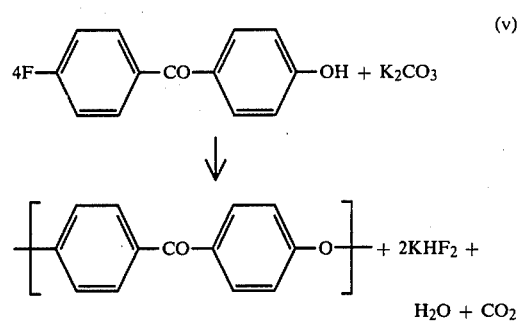

I have found that in certain cases this process may give faster reactions, and higher molecular weight and less coloured polymers than a polymerisation process involving reactions (iii) and (ii) only, i.e. using potassium fluoride in place of potassium carbonate, viz

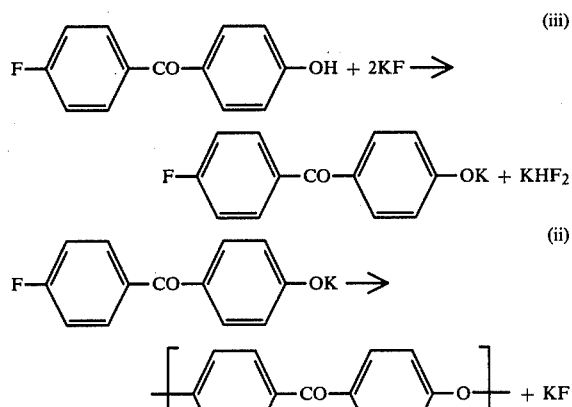

i.e. overall

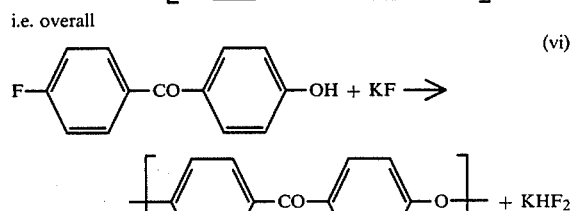

It will be appreciated that, where the reaction conditions are such that alkali metal bicarbonate decomposes to form alkali metal carbonate, carbon dioxide, and water, the alkali metal carbonate can be replaced by an appropriate amount of alkali metal bicarbonate. Thus in the example described hereinbefore, the overall reaction (v) would become

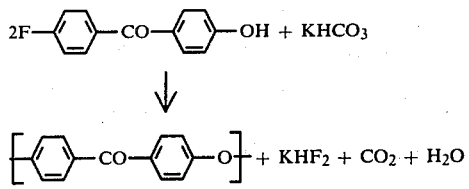

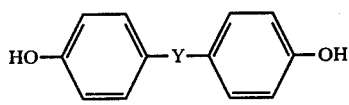

It will further be appreciated that the fluorine containing reactant, i.e. the fluorophenol or difluorobenzenoid compound, may be used in conjunction with reactants containing other halogen atoms in place of fluorine. In such cases of course the amount of alkali metal carbonate (or bicarbonate) required will be more than when using only fluorine containing reactants.

Accordingly I provide a process for the production of an aromatic polyether comprising polycondensing, by heating to a temperature in the range 100° to 400° C. (i) a substantially equimolar mixture of (a) at least one bisphenol of formula

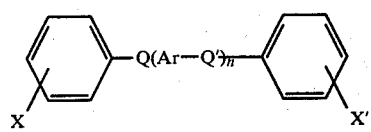

in which Y is a direct link, oxygen, sulphur, —SO$_2$—, —CO—, or a divalent hydrocarbon radical, and (b) at least one dihalobenzenoid compound, and/or (ii) at least one halophenol, in which dihalobenzenoid compound or halophenol the halogen atoms are activated by —SO$_2$— or —CO— groups ortho or para thereto, the halogen of at least some of the halophenol and/or dihalobenzenoid compound being fluorine, with (iii) an alkali metal carbonate or bicarbonate, the amount of alkali metal carbonate or bicarbonate being such that there is at least $(1-x/2)$, and less than one, atom of alkali metal per phenol group, where x is the fraction of the activated halogen atoms that are fluorine.

Particularly preferred bisphenols include
4,4'-dihydroxybenzophenone
4,4'-dihydroxydiphenylsulphone
2,2'-bis-(4-hydroxyphenyl)propane
4,4'-dihydroxybiphenyl.

The dihalobenzenoid compounds preferably have the formula

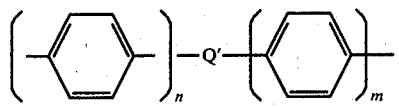

in which X and X', which may be the same or different, are halogen atoms and are ortho or para to the groups Q and Q'; Q and Q', which may be the same or different, are —CO— or —SO$_2$—; Ar is a divalent aromatic radical; and n is 0, 1, 2 or 3.

The aromatic radical Ar is preferably a divalent aromatic radical selected from phenylene, biphenylylene or terphenylylene, and diphenyl ether.

Particularly preferred dihalides include 4,4'-bis-(4-halophenylsulphonyl)diphenyl ethers, 4,4'-bis-(4-halobenzoyl) diphenyl ethers, and dihalides having the formula

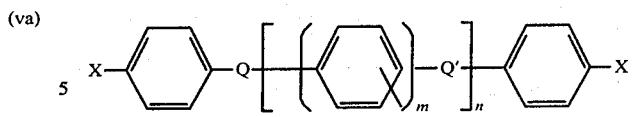

where m is 1, 2 or 3.

Examples of suitable dihalides include
4,4'-difluorodiphenylsulphone
4,4'-dichlorodiphenylsulphone
4,4'-difluorobenzophenone
4,4'-dichlorobenzophenone
4-chloro-4'-fluorodiphenylsulphone
4-chloro-4'-fluorobenzophenone
4,4'-bis-(4-fluorophenylsulphonyl)biphenyl
4,4'-bis-(4-chlorophenylsulphonyl)biphenyl
1,4-bis-(4-chlorobenzoyl)benzene
1,4-bis-(4-fluorobenzoyl)benzene
4,4'-bis-(4-fluorophenylsulphonyl)diphenyl ether
4,4'-bis-(4-chlorophenylsulphonyl)diphenyl ether
bis-[4'-(4-chlorophenylsulphonyl)biphenyl]sulphone.

Mixtures of dihalides may be employed so as to produce copolymers. Examples of mixtures that may be employed include 4,4'-difluorodiphenylsulphone with 4,4'-difluorobenzophenone or 4,4'-bis-(4-chlorophenylsulphonyl)biphenyl.

Preferred halophenols are those of formula

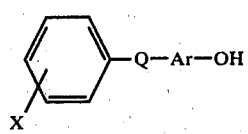

wherein X is halogen and is ortho or para to Q, Q is —SO$_2$— or —CO—, and Ar is an aromatic radical, and is preferably para to the group Q.

The aromatic radical Ar is preferably a divalent aromatic radical selected from phenylene, biphenylene, and radicals of the formula

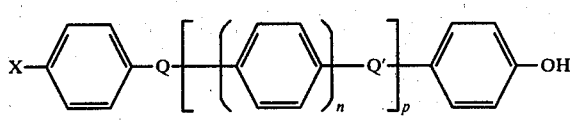

where Q' is —CO— or —SO$_2$— and n and m, which may be the same or different, are integers selected from 1, 2 and 3. Particularly preferred halophenols have the formula

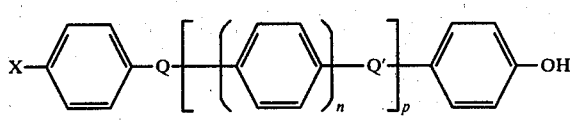

where p is 0 or 1.

Examples of suitable halophenols include
4-(4-chlorophenylsulphonyl)phenol
4-(4-fluorophenylsulphonyl)phenol
4-(4-fluorobenzoyl)phenol
4-(4-chlorobenzoyl)phenol
4-hydroxy-4'-(4-chlorophenylsulphonyl)biphenyl
4-hydroxy-4'-(4-fluorophenylsulphonyl)biphenyl 4-(4-hydroxyphenylsulphonyl)-4'-(4-chlorophenyl sulphonyl)biphenyl.

Mixtures of halophenols may be employed so as to produce copolymers. Examples of mixtures that may be employed include 4-(4-fluorophenylsulphonyl)phenol with 4-(4-fluorobenzoyl)phenol, 4-hydroxy-4'-(4-chlorophenylsulphonyl)biphenyl, or 4-(4-hydroxyphenylsulphonyl)-4'-(4-chlorophenylsulphonyl)biphenyl.

Equally mixtures of one or more halophenols with a substantially equimolar mixture of a dihalide and a bisphenol (having a formula as specified) may be employed. As an example there may be mentioned 4-(4-fluorobenzoyl) phenol in admixture with 4,4'-dichloro (or difluoro) diphenyl sulphone and 4,4'-dihydroxydiphenylsulphone.

It will be appreciated that at least one of the halogen containing reactants is a fluorine containing reactant. Preferably at least 10%, more preferably at least 50%, of the activated halogen atoms in the halogen containing reactants are fluorine.

The amount of alkali metal carbonate or bicarbonate employed is such that there is less than 1 but at least $(1-x/2)$ atom of alkali metal per phenol group, where x is the fraction of the activated halogen atoms that are fluorine. Thus where all the activated halogen atoms are fluorine $x=1$ so the amount of alkali metal carbonate or bicarbonate is such that there is at least $\frac{1}{2}$ an atom of alkali metal per phenol group. Preferably the amount of alkali metal carbonate or bicarbonate is such that there is between $(1-x/2)$ and $1.2 (1-x/2)$ atoms of alkali metal per phenol group as larger quantities may lead to cleavage of the polymer, especially at high reaction temperatures (over 300° C.) giving rise to polymers of relatively low molecular weight.

Where a bisphenol (having a formula as specified) and dihalobenzenoid compound are employed, they should be used in substantially equimolar amounts. An excess of one over the other leads to the production of low molecular weight products. However a slight excess, up to 5 mol %, of dihalide may be employed if desired.

The alkali metal carbonate or bicarbonate is preferably selected from sodium carbonate, sodium bicarbonate, potassium carbonate, potassium bicarbonate, rubidium carbonate and caesium carbonate. Mixtures may be employed. In particular it may be advantageous to use a major amount of a carbonate or bicarbonate of one alkali metal in admixture with a minor amount of a carbonate or bicarbonate of an alkali metal of higher atomic number as the polymerisation rate may thereby be enhanced. Particularly effective combinations include sodium carbonate or bicarbonate in admixture with potassium or caesium carbonates and potassium carbonate in admixture with caesium carbonate. Potassium carbonate alone or in admixture with caesium carbonate is most preferred.

The reaction may be carried out in the presence of an inert solvent, or in the absence of a solvent.

Preferably a solvent is employed and is an aliphatic or aromatic sulphoxide or sulphone of formula

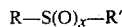

where x is 1 or 2 and R and R' are alkyl or aryl groups and may be the same or different. R and R' may together form a divalent radical. Preferred solvents include dimethyl sulphoxide, dimethyl sulphone, sulpholane (1,1 dioxothiolan), or aromatic sulphones of the formula

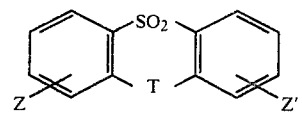

where T is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxathiin dioxide and 4-phenylsulphonyl biphenyl. Diphenylsulphone is the preferred solvent. Other solvents that may be used include N,N-dimethyl formamide and N-methyl-2-pyrrolidone.

The polymerisation temperature employed is in the range 100° to 400° C. and will depend on the nature of the reactants and the solvent, if any, employed. Thus when using very reactive condensants, such as 4,4'-difluorodiphenylsulphone in admixture with 4,4'-dihydroxydiphenyl sulphide, temperatures of the order of 100° to 140° C. may be used. For reactant combinations such as 4,4'-dichlorodiphenylsulphone and 2,2-bis-(4-hydroxyphenyl)propane, temperatures of the order of 140° to 180° C. are suitable, but for systems such as 4,4'-dihalodiphenylsulphone/4,4'-dihydroxydiphenylsulphone, and the ketone analogues, temperatures in excess of 250° C., preferably above 270° C., are generally desirable. For the production of some polymers, it may be desirable to commence polymerisation at one temperature, e.g. between 200° and 250° C., and to increase the temperature as polymerisation ensues. This is particularly necessary when making polymers having only a low solubility in the solvent. Thus, there it is desirable to increase the temperature progressively to maintain the polymer in solution as its molecular weight increases.

Where no solvent is employed, the temperature should be sufficient to maintain the halophenol or bisphenol/dihalobenzenoid compound, and the polymer produced therefrom, in the molten state.

To minimise cleavage reactions, it is preferred that the maximum polymerisation temperature is below 350° C. and in particular is the lowest that gives a convenient polymerisation time.

Where a bicarbonate is employed and is added as such to the reaction vessel the heating to the polymerisation temperature should be conducted carefully to minimise adverse effects of the evolution of carbon dioxide occurring on decomposition of the bicarbonate.

The polymerisation reaction may be terminated by mixing a suitable end stopping reagent, e.g. a mono or polyfunctional halide such as methyl chloride, t-butyl chloride or 4,4'-dichlorodiphenylsulphone with the reaction mixture at the polymerisation temperature although end stopping may lead to some reduction in the polymer molecular weight.

In the reaction, alkali metal salts are produced as byproducts. These, together with any polymerisation solvent employed, can be removed from the reaction product by known methods employing techniques such as filtration and leaching.

Polymers prepared by the process of the present invention are particularly suitable for use in applications where the polymer is liable to be subject to high service temperatures. Examples of such applications include electrical connector mouldings, and cookware coatings.

The invention is illustrated by the following Examples.

EXAMPLE 1 (comparative)

4-(4-fluorobenzoyl)phenol (20.5402 g, 0.095 mol); 4,4'-dihydroxydiphenylsulphone (0.6257 g, 0.0025 mol); 4,4'-dichlorodiphenylsulphone (0.8615 g, 0.003 mol); diphenylsulphone (42 g); and potassium carbonate (7.05 g, 98% by weight $K_2CO_3$ as estimated by titration against normal hydrochloric acid, 0.050 mol) were charged to a 3-neck flask (capacity 250 ml) equipped with a stirrer, nitrogen inlet and a still head.

[94% of the activated halogen atoms are fluorine, i.e. x=0.94. The number of potassium atoms per phenol group is 1; 1 mol % excess of activated halogen atoms over phenol groups.]

The flask was then placed on a metal bath at 200° C. and the temperature then raised to 330° C. over a period of 1 hour. The temperature was maintained at 330° C. for 30 minutes. The flask was then removed from the metal bath and cooled to room temperature. The solid reaction product was then milled to a particle size of less than 1 mm and then washed by refluxing with the following solvents acetone (500 ml; 10 minutes)—twice water (500 ml; 10 minutes)

1% by weight aqueous acetic acid (500 ml; 10 minutes)

water (500 ml; 30 minutes)

a mixture of acetone (250 ml) and methanol (250 ml) (10 minutes)

The resultant solid was dried in an oven at 140° C. for 16 hours under a vacuum of 100 mm of mercury. The resultant polymer, which had the repeat units

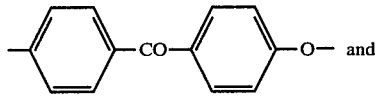

and

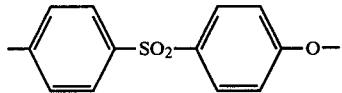

in the ratio 95:5 had a reduced viscosity (RV) of 1.34 and absorbance 0.05 [RV measured at 25° C., absorbance at a wavelength of 550 nm in a 10 mm cell, both measurements made using a solution of the polymer in concentrated sulphuric acid of density 1.84 g.cm$^{-3}$, said solution containing 1 g of polymer per 100 cm$^3$ of solution].

EXAMPLE 2

Example 1 was repeated, but using a smaller quantity of the 98% potassium carbonate (6.98 g, 0.0495 mol). [The number of potassium atoms per phenol group is thus 0.99.] Polycondensation was conducted as in Example 1 except that the mixture was maintained at 330° C. for 2 hours with small samples being taken after 50 and 80 minutes. The results are shown in Table 1.

EXAMPLE 3

Example 2 was repeated but using a smaller quantity of the 98% potassium carbonate (6.77 g, 0.048 mol). [The number of potassium atoms per phenol group is thus 0.96.] Samples were taken after 60 and 90 minutes. The results are shown in Table 1.

EXAMPLE 4

Example 1 was repeated but using only (6.55 g, 0.0466 mol) of the 98% potassium carbonate so that the number of potassium atoms per phenol group was 0.932. The mixture was maintained at 330° C. for 3 hours whereupon a sample was taken. 4,4'-dichlorodiphenylsulphone (0.5 g) was added to the remainder of the reaction mixture and heating continued for 10 minutes at 330° C. to effect termination of polymerisation before cooling to room temperature. The results are shown in Table 1.

EXAMPLE 5 (comparative)

By way of comparison Example 1 was repeated but using only 38 g of diphenylsulphone and using potassium fluoride (6.74 g, 0.116 mol) in place of potassium carbonate. The reaction mixture was heated at 230° C. for 1 hour, then at 275° C. for 1 hour. Unlike Examples 1–4 which formed a thick yellow paste at these temperatures, this mixture remained as a mobile slurry. The temperature was then raised to 330° C. and maintained for 5 hours to give a viscous brown solution. [In Examples 1–4 the solution was yellow or cream at the end of the heating.] The results are shown in Table 1.

TABLE 1

| Example | K/OH ratio | Time at 330° C. (min) | RV | Absorbance |
|---|---|---|---|---|
| 1 (comparative) | 1 | 30 | 1.34 | 0.05 |
| 2 | 0.99 | 50 | 1.45 | 0.05 |
|  |  | 80 | 1.87 | 0.07 |
|  |  | 120 | 2.46 | 0.11 |
| 3 | 0.96 | 60 | 0.90 | 0.04 |
|  |  | 90 | 1.41 | 0.04 |
|  |  | 120 | 1.67 | 0.06 |
| 4 | 0.932 | 180 | 1.19 | 0.10 |
|  |  | 190* | 1.08 | 0.10 |
| 5 (comparative) | 1.16+ | 300 | 1.5 | 0.15 |

*after end stopping
+KF used in place of $K_2CO_3$

It is seen that the use of smaller amounts of potassium carbonate than necessary to give 1 atom of potassium per phenol group moderates the polycondensation reaction but enables polymers of high molecular weight (high RV) to be obtained with a low absorbance.

EXAMPLE 6 (comparative)

Example 1 was repeated using the following reactants: 1,4-(4-fluorobenzoyl)benzene (16.2770 g, 0.505 mol); 4,4'-dihydroxybenzophenone (7.1336 g, 0.0333 mol); 4,4'-dihydroxydiphenylsulphone (4.1796 g, 0.0167 mol); 98% potassium carbonate (7.05 g, 0.050 mol); diphenylsulphone (38.3 g). [The proportion of activated halogen atoms that are fluorine is thus 1; the K/OH ratio is 1; the excess of fluoride over the biphenols is 1 mol %.]

Polycondensation was effected by heating at 230° C. for 30 minutes, 280° C. for 30 minutes and then 320° C. for 1 hour. A sample was then taken and 4,4'-dichlorodiphenyl sulphone (0.5 g) added to the remainder of the reaction mixture to end stop the reaction by heating for a further 5 minutes at 320° C. before cooling to room temperature.

The polymer had the repeating units

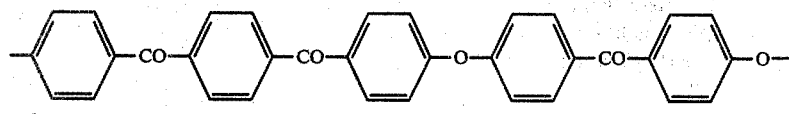

and

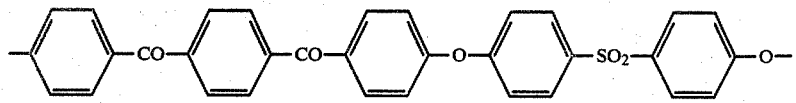

in the proportion 2:1.

The results are shown in Table 2.

EXAMPLE 7

Example 6 was repeated but using a much smaller amount of the 98% potassium carbonate (3.63 g, 0.026 mol). The potassium/phenol group ratio is thus 0.52.

The polycondensation was conducted as in Example 6 except that the heating time at 320° C. was 2½ hours (with a sample taken after 1½ hours) before end stopping. The end stopping was performed by heating for 10 minutes at 320° C. after adding the 4,4'-dichlorodiphenylsulphone.

The results are shown in Table 2.

TABLE 2

| Example | K/OH ratio | Time at 320° C. (min) | RV | Absorbance |
|---|---|---|---|---|
| 6 | 1 | 60 | 1.81 | 0.48 |
|   |   | 65* | 1.68 | 0.48 |
| 7 | 0.52 | 90 | 1.17 | — |
|   |   | 150 | 2.08 | — |
|   |   | 160* | 1.79 | 0.31 |

*after end stopping

These Examples show that the use of smaller amounts of potassium carbonate than that corresponding to a K/OH ratio of 1 moderates the reaction but enables high molecular weight polymers of low absorbance to be obtained. Examples 4, 6 and 7 show that end stopping with 4,4'-dichlorodiphenyl sulphone gives a reduction in reduced viscosity, and hence molecular weight.

EXAMPLE 8 (comparative

Example 1 was repeated but using as reactants 4-(4-chlorobenzoyl)phenol (20.9403 g, 0.090 mol); 4-(4-chlorophenylsulphonyl)phenol (2.6850 g, 0.010 mol); 98% potassium carbonate (6.57 g, 0.0466 mol); diphenylsulphone (40 g).

[The ratio of activated fluorine to chlorine atoms is 0. The K/OH ratio is 0.932.]

Polycondensation was effected by heating to 320° C. over 1 hour and then maintained at 320° C. for 2 hours. The RV of the resultant polymer, which had repeat units

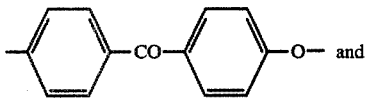 and

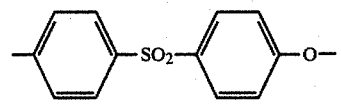

in the ratio 90:10, was only 0.45 while the absorbance was 0.13. This Example shows that, in the absence of activated fluorine containing condensants only relatively low molecular weight polymers are obtainable when using such an amount of potassium carbonate that the K/OH ratio is less than 1.

I claim:

1. A process for the production of an aromatic polyether comprising polycondensing, by heating to a temperature in the range 100° to 400° C. (i) a substantially equimolar mixture of (a) at least one bisphenol of formula

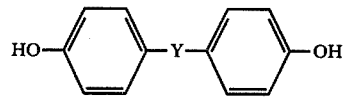

in which Y is a direct link, oxygen, sulphur, —SO₂—, —CO— or a divalent hydrocarbon radical, and (b) at least one dihalobenzenoid compound, and/or (ii) at least one halophenol, in which dihalobenzenoid compound or halophenol the halogen atoms are activated by —SO₂— or —CO— groups ortho or para thereto, the halogen of at least some of the halophenol and/or dihalobenzenoid compound being fluorine, with (iii) an alkali metal carbonate or bicarbonate, the amount of alkali metal carbonate or bicarbonate being such that there is at least (1−x/2), and less than one, atom of alkali metal per phenol group, where x is the fraction of the activated halogen atoms that are fluorine.

2. A process according to claim 1 wherein x is at least 0.1.

3. A process according to claim 2 wherein x is at least 0.5.

4. A process according to claim 1 wherein the amount of alkali metal carbonate or bicarbonate is such that there is between (1−x/2) and 1.2 (1−x/2) atoms of alkali metal per phenol group.

5. A process according to claim 1 in which at least one dihalobenzenoid compound is employed, the at least one dihalobenzenoid compound being selected from dihalobenzenoid compounds of the formula

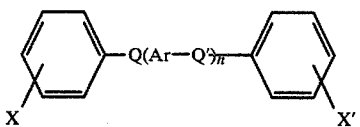

in which X and X', which may be the same or different, are halogen atoms and are ortho or para to the groups Q and Q'; Q and Q', which may be the same or different, are —CO— or —SO₂—; Ar is a divalent aromatic radical; and n is 0, 1, 2 or 3.

6. A process according to claim 5 in which the at least one dihalobenzenoid compound is selected from the group consisting of 4,4'-bis-(4-halophenylsulphonyl)-diphenyl ethers, 4,4'-bis-(4-halobenzoyl)diphenyl ethers, and dihalides having the formula

where m is 1, 2 or 3.

7. A process according to claim 1 wherein at least one halophenol is employed, said at least one halophenol being selected from halophenols having the formula

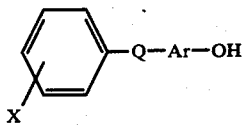

wherein X is halogen and is ortho or para to Q, Q is —SO$_2$— or —CO—, and Ar is an aromatic radical.

8. A process according to claim 7 wherein Ar is a divalent aromatic radical selected from the group consisting of phenylene, biphenylene, and radicals of the formula

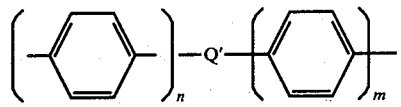

where Q' is —CO— or —SO$_2$— and n and m, which may be the same or different, are integers selected from 1, 2 and 3.

9. A process according to claim 8 in which the halophenol is selected from halophenols having the formula

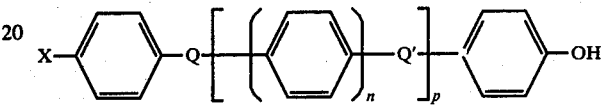

where p is 0 or 1.

* * * * *